United States Patent
Song et al.

(10) Patent No.: US 12,499,316 B2
(45) Date of Patent: Dec. 16, 2025

(54) METHOD AND APPARATUS FOR ANALYZING EMOTIONS OF TEXT AND GENERATING FEEDBACK RESPONSES ON TEXT

(71) Applicant: The Education University of Hong Kong, Hong Kong (HK)

(72) Inventors: Yanjie Song, Hong Kong (HK); Chi-Kin John Lee, Hong Kong (HK); Kaiyi Wu, Hong Kong (HK); Qing Li, Hong Kong (HK)

(73) Assignee: The Education University of Hong Kong, Hong Kong (HK)

( * ) Notice: Subject to any disclaimer, the term of this patent is extended or adjusted under 35 U.S.C. 154(b) by 295 days.

(21) Appl. No.: 18/497,001

(22) Filed: Oct. 30, 2023

(65) Prior Publication Data

US 2025/0139372 A1 May 1, 2025

(51) Int. Cl.
*G06F 40/30* (2020.01)

(52) U.S. Cl.
CPC .................................. *G06F 40/30* (2020.01)

(58) Field of Classification Search
None
See application file for complete search history.

(56) References Cited

U.S. PATENT DOCUMENTS

| 10,776,568 | B2 * | 9/2020 | Waters | G06F 40/166 |
| 2009/0248399 | A1 | 10/2009 | Au | |

| 2013/0226561 | A1 | 8/2013 | Park et al. | |
| 2020/0004816 | A1 * | 1/2020 | Kieser | G06F 40/30 |
| 2020/0152304 | A1 * | 5/2020 | Chang | G10L 25/63 |
| 2022/0093253 | A1 * | 3/2022 | Misrilall | G16H 50/20 |

(Continued)

FOREIGN PATENT DOCUMENTS

| CN | 103744953 A | 4/2014 |
| CN | 111326222 A | 6/2020 |
| CN | 114822778 A | 7/2022 |

(Continued)

OTHER PUBLICATIONS

Martin Seligman, "Flourish: A Visionary New Understanding of Happiness and Well-being", 2011, Free Press, New York, US.

(Continued)

*Primary Examiner* — Nafiz E Hoque
(74) *Attorney, Agent, or Firm* — IDEA Intellectual Limited; Sam T. Yip

(57) ABSTRACT

An apparatus for analyzing emotions of diaries and generating feedback response on diaries is provided. The apparatus includes a recorder, a negative-text analysis module, a positive-text adding module, and a visualization module. The recorder is configured to receive and store a text article. The negative-text analysis module is configured to analyze the text article and determine a negativity level and generate a basis for judgment according to an analyzing result with respect to the text article. The positive-text adding module is configured to receive the basis from the negative-text analysis module, generate feedback response that is positively oriented relative to the text article, and combine the text article with the feedback response to form a content. The visualization module is configured to visualize the content for creating a visual image.

20 Claims, 7 Drawing Sheets

(56) References Cited

U.S. PATENT DOCUMENTS

2022/0223064 A1\* 7/2022 Chauhan ............... G06F 3/0482

FOREIGN PATENT DOCUMENTS

| CN | 116601615 A | 8/2023 |
|---|---|---|
| HK | 30068004 A | 9/2022 |

OTHER PUBLICATIONS

Jacolyn M. Norrish et al., "An applied framework for positive education", International Journal of Wellbeing, 2013, vol. 3, p. 147-161.

Anat Shoshani et al., "Middle School Transition from the Strengths Perspective: Young Adolescents' Character Strengths, Subjective Well-Being, and School Adjustment", Journal of Happiness Studies, 2013, vol. 14, p. 1163-1181.

\* cited by examiner

METHOD AND APPARATUS FOR ANALYZING EMOTIONS OF TEXT AND GENERATING FEEDBACK RESPONSES ON TEXT

TECHNICAL FIELD

The present invention relates to techniques of recognizing and analyzing human emotions from texts and generating feedback responses using large language models.

BACKGROUND

In the aftermath of the COVID-19 pandemic, a pressing concern has emerged—emotional distress experienced by the mass population across all ages and occupations. Prolonged periods of isolation, uncertainty, and disrupted routines have led to various emotional challenges, from heightened anxiety and stress to feelings of loneliness and depression. As educational institutions strive to restore normalcy, there is an urgent call to holistically support students' well-being in not just academics but also emotional states.

Traditional diary-writing has long been a therapeutic avenue for emotional release. However, its appeal often wanes due to perceived monotony, leading to waning interest over time. Additionally, expressing negative emotions in writing might inadvertently intensify feelings of anxiety and depression. The incorporation of images and illustrations into diaries, while may potentially enhance expressions and add excitements, can complicate the otherwise simple user experience and discourage consistent journaling.

Therefore, there exists a need in the art to enhance the allure of diary-writing with a focus on addressing emotional issues, such as anxiety, depression, and low self-esteem, particularly among youths.

SUMMARY OF INVENTION

It is an objective of the present invention to provide an apparatus and a method to address the aforementioned shortcomings and unmet needs in the state of the art. In accordance with a first aspect of the present invention, an apparatus for analyzing a writer's emotions implied from one or more diary entries and generating feedback responses to the diary entries is provided. The apparatus includes a recorder, a negative-text analysis module, a positive-text adding module, and a visualization module. The recorder is configured to receive and store a text article. The negative-text analysis module is configured to analyze the text article and determine a negativity level, and generate a basis for judgment according to an analyzing result with respect to the text article. The positive-text adding module is configured to receive the basis from the negative-text analysis module, generate a feedback response that is positively oriented relative to the text article, and combine the text article with the feedback response to form a content. The visualization module is configured to visualize the content for creating a visual image.

In accordance with a second aspect of the present invention, a method for analyzing a writer's emotions implied from one or more diary entries and generating feedback responses to the diary entries is provided. The method comprises the steps: receiving and store a text article by a recorder; analyzing the text article and determining a negativity level of the text article by a negative-text analysis module; generating a basis for judgment according to the analyzing the text article by a negative-text analysis module; receiving the basis by a positive-text adding module; generating a feedback response that is positively oriented relative to the text article in response to the basis by the positive-text adding module; combining the text article with the feedback response to form a content by the positive-text adding module; and generating a visual image in response to the content by a visualization module to visualize the content.

By the embodiments of the present invention, the apparatus and method analyse a writer's emotions implied from his/her diary entries and generate feedback responses based on a model of five aspects: positive emotions, engagement, positive relationships, meaning, and accomplishment—(PERMA) framework, which can be called PERMA model as well. The apparatus and method use multiple AI models to aid a writer in creating diary entries with personalized prompts and images that are related to his/her daily life events, feelings, and thoughts. The present invention aims to address emotional problems such as anxiety, depression, or low self-esteem, and facilitate individual mental wellness.

Although the embodiments of the present invention in the present disclosure focus on writings in the form of personal diaries, an ordinarily skilled person in the art will appreciate that the embodiments are readily adaptable to other forms of writings and recordings on events, feelings, and thoughts without undue experimentation and deviation from the spirit of the present invention.

BRIEF DESCRIPTION OF DRAWINGS

Embodiments of the invention are described in more details hereinafter with reference to the drawings, in which.

DETAILED DESCRIPTION OF THE INVENTION

In the following description, apparatuses and methods for analyzing emotions of diaries and generating feedback response on diaries to create personal diary with personalized prompts and images, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
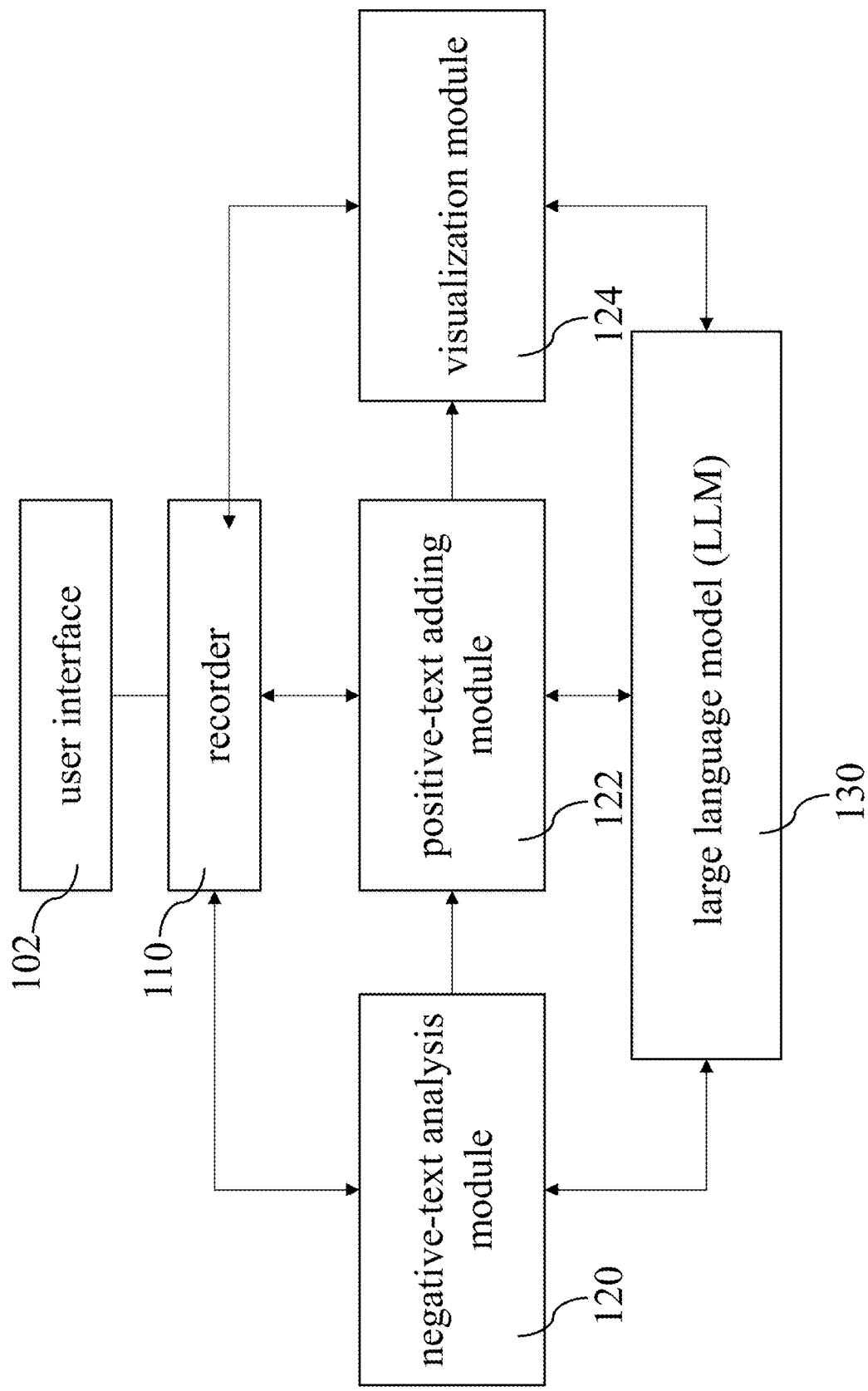
FIG. 1 depicts a schematic diagram of an apparatus for analyzing a writer's emotions implied from diary entries and generating feedback responses to the diary entries in accordance with the first aspect of the present invention.

Referring to FIG. 1 for the following description. The apparatus 100 includes a user interface 102, a recorder 110, a negative-text analysis module 120, a positive-text adding module 122, a visualization module 124, and a large language model (LLM) 130.

The user interface 102 facilitates electrical communication with other components through wired or wireless connections, thereby enabling interactive capabilities. For example, users of the apparatus 100 can enter text into the apparatus 100 via the user interface 102. Moreover, the user interface 102 can display at least one processing result of the apparatus 100.

The recorder 110 is configured to receive and store a text article from the user interface 102 inputted by the user. In an embodiment, the recorder 110 is further configured to attach a timestamp to each text article. Consequently, there may exist several text articles stored in the recorder 110, each distinguished by its own unique timestamp. The outcomes of the negative-text analysis module 120, the positive-text adding module 122, and the visualization module 124 can be sent to the recorder 110 for recording.

The negative-text analysis module 120 is configured to access the recorder 110 and analyze a text article stored in the recorder 110. The negative-text analysis module 120 analyzes the target text article and determines a negativity level thereof based on a PERMA framework or a PERMA model. According to the analysis result with respect to the text article, the negative-text analysis module 120 is further configured to generate a basis for judgment. In an embodiment, the basis for judgment generated by the negative-text analysis module contains a percentage value representing the negativity level of the text article. For example, the negativity level associated with various emotional states may be represented on a scale, where the negativity level for being joyful being 0%, neutral being 50%, distressed being 80%, and depressed being 100%. In an embodiment, the negative-text analysis module 120 is further configured to analyze possibilities for negative emotions in the original text article stored in the recorder 110 and identify what are sources of negative emotions.

To detect negative emotional language in the text, the LLM 130 is employed and trained to identify sources of negative emotions. During its training, the LLM 130 is trained to compare words to a list of negative emotion terms like "sadness" or "anxiety." The LLM 130 is then able to assess word polarity based on the PERMA framework, including scores for indicating negativity. In considering the sentence context, the LLM 130 can identify negation words like "not," and detect semantic associations. Specialized lexicons or events can be employed to aid detection. By combining these approaches, the identification of sources of negative emotions in the text is achieved. The generated basis for judgment may depend on the identification's accuracy.

The positive-text adding module 122 is configured to access the recorder 110 and receive the basis for judgment from the negative-text analysis module 120 for further proceeding. The positive-text adding module 122 generates a feedback response that is positively oriented relative to the text article stored in the recorder 110 and further combines the text article with the feedback response to form a content. Herein the description "positively oriented relative to the text article" means the feedback response is formed for positive guidance or for forward booting as the original text article involves negative concept. In one embodiment, the generation of the feedback response includes providing at least one sentence presented in the first-person manner for positive guidance, and the placement of the feedback response is immediately after the text article. For example, sentences starting with "I" can be used to link after the original text article. In one embodiment, the content generated by the positive-text adding module 122 can be recorded/stored in the recorder 110.

To generate a feedback response with respect to the original text article, the LLM 130 is employed and trained to add correspondingly positive texts. During the training, the LLM 130 can gather text data containing negative sentiments and respective positive feedback responses to ensure a diverse dataset encompassing various text types and negative emotions. Subsequently, a substantial set of bases for judgment instances are incorporated as labels for each negative text sample, and the appropriate positive feedback response is assigned. Then, each result can be fine-tuned, such that the LLM 130 learns how to assess the negativity level of text according to the basis for judgment and generate relevant positive feedback response, thereby offering comfort and encouragement with respect to fed text.

The visualization module 124 is configured to receive the content generated by the positive-text adding module 122 and visualize the same for the creation of a visual image. In this regard, the visualization module 124 generates at least one visualization label in response to the content. Specifically, the visualization module 124 provides visual descriptions for the emotion implied in the content and use tangible, concrete objects to illustrate them, thereby generating the visualization labels. Then, the visualization module 124 creates at least one visual image according to the visualization labels.

To visualize the content, the LLM 130 is employed and trained to learn how to associate specific emotional substances with appropriate visualization labels. During the training, a prompt strategy database is prepared. The training data contains pairs of text passages and their corresponding visualization labels that represent different emotions. The training data further contains examples of textual descriptions that are linked to visual depictions of tangible objects. The training data is input to the LLM 130 to allow the LLM 130 to learn the accurate and relevant visualization labels for different emotional conditions.

In one embodiment, the visualization module 124 includes a latent text-to-image diffusion model (e.g., an artificial neural network), which is capable of generating at least one image in cartoon or comic book style given the visualization labels. In order to create a proper image, a fine-tuning process for the model is performed to improve the expression of the model. For example, the model is trained to output an image that shows a single character against a landscape background or that shows a landscape only in response to at least one visualization label. One implementation of the visualization module 124 uses stable diffusion for training an artificial neural network to reverse the process of introducing "noise" (e.g., random pixels) to an image. This allows the visualization module 124 to create very coherent and realistic images and adjust the appearance of the image according to different style parameters.

The cooperation of the negative-text analysis module 120, the positive-text adding module 122, and the visualization module 124 is performed for prompt engineering within the LLM 130, which aim to enhance the performance of the generation tasks within the architecture by developing and refining the prompts used. The inherent unpredictability of large language model, owing to the varied contexts and purposes of texts used during model training, necessitates the construction of controlled, task-specific prompts, particularly for the architecture which is targeted at fostering positive education among students.

In accordance with one embodiment of the present invention, the prompt engineering, which focuses on creating prompt cases covering a broad range of typical situations, comprises the following components: input, output, and event type. These are defined as: (1) input: the instructions provided by users to the user interface 102; (2) output: any text or texts generated by the negative-text analysis module 120, the positive-text adding module 122, and the visualization module 124 using the LLM 130; and (3) event type: predefined categories of events, such as shopping, walking, attending classes, etc. These outcomes are selected from instances where the LLM 130 has demonstrated effective generation. Moreover, the curated cases are stored according to their corresponding tasks in a database. Following the prompt case collection, each case undergoes programmatic modification for dividing into variables and constants. The variables are populated with user-input content, while the constants remain unchanged, forming a prompt strategy dataset. During the run-time operation, corresponding strategies are sequentially retrieved from the database, querying the large language model 130 to check if the expected outcome has been reached. Such AI-driven approach, combining advanced language models with the PERMA framework and innovative prompt engineering, can play a significant role in promoting mental wellness.

Figure 2:
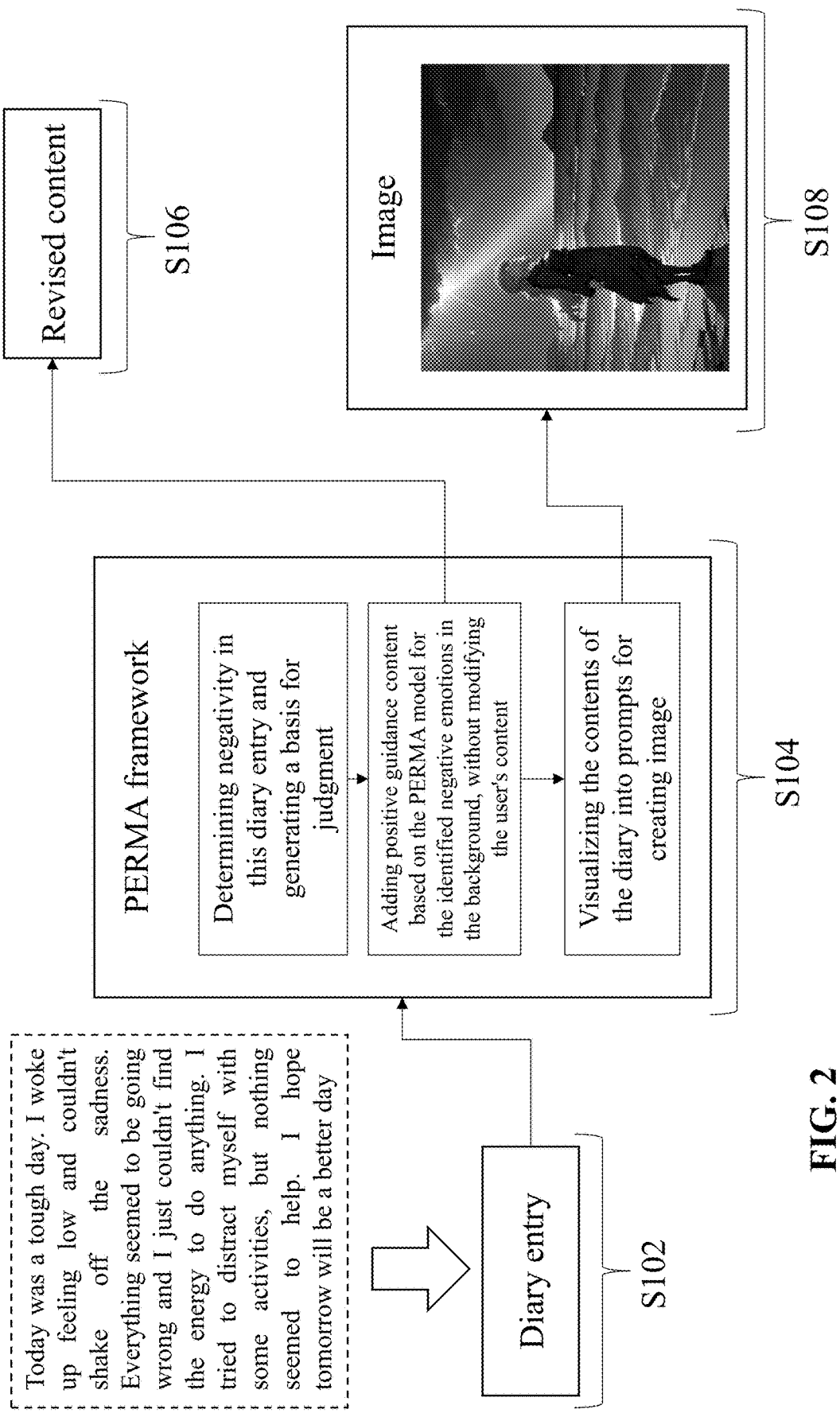
FIG. 2 depicts a schematic flowchart for analyzing a writer's emotions implied from diary entries and generating feedback responses to the diary entries in accordance with the second aspect of the present invention.

Referring to FIGS. 1 and 2 for the following description. In accordance with one embodiment of the present invention, the method for analyzing a writer's emotions implied from diary entries and generating feedback response to the diary entries includes steps S102, S104, S106, and S108.

In the step S102, the user of the apparatus 100 can write down and input a diary entry to be received and stored by the recorder 120 of the apparatus 100. In one exemplary embodiment, the input diary entry is: "today was a tough day. I woke up feeling low and couldn't shake off the sadness. Everything seemed to be going wrong and I just couldn't find the energy to do anything. I tried to distract myself with some activities, but nothing seemed to help. I hope tomorrow will be a better day."

In the step S104, the apparatus 100 processes the diary entries based on the PERMA framework by the negative-text analysis module 120, the positive-text adding module 122, and the visualization module 124.

The negative-text analysis module 120 determines the negativity of the diary entries and correspondingly generate a basis for judgment for the diary entries. For example, with respect to the aforementioned exemplary diary, the negative-text analysis module 120 may output an analysis result as follows: the emotions implied in this diary entry are close to distress (e.g., the negative-text analysis module 120 detects 3 negative PERMA model indicators, negative emotion, lack of participation, and interpersonal relationships); the writer describes his/her feelings as low, sad, listless, everything going wrong, unable to be distracted by other activities; these descriptions indicate that the writer's mood at the time was relatively negative. The analysis result serves as a basis for judgement.

The positive-text adding module 122 may add positive guidance content based on the PERMA model for the identified negative emotions in the background, without modifying the user's content (i.e., the as-is user's content). For example, the positive guidance content is added as a feedback response at the end of the user's diary entry. For example, with respect to the diary entry and the analysis result provided by the negative-text analysis module 120, the positive-text adding module 122 provides the feedback response including sentences presented in the first-person manner for positive guidance as follows: "however, I know that this is only temporary, and everyone will have bad times. I will continue to work hard and believe that tomorrow will be a better day." The positive-text adding module 122 forms a revised content that includes the diary entry and the feedback response attached to the end of the diary entry. The revised content is then sent out in the step S106 for recording.

Figure 3B:
FIGS. 3A and 3B depict two images created using the prompts as illustrated in FIG. 2.
Figure 3A:

The visualization module 124 may visualize the revised content into prompts for creating images and accordingly create an image using a diffusion model. The image is sent out in the step S108 for recording. More specifically, as shown in FIGS. 3A and 3B, there are two images created by the a diffusion model using prompts provided by the visualization module 124, including: (masterpiece: 1.5), (best quality), (highly detailed), (ultra-detailed), (gloomy), (depleted), (thick dark clouds), (dimly lit surroundings), (weary posture), (struggling figure), (faint glow of hope), (glimmers of light), (drained energy), (persevering spirit), (moment of breakthrough), (sunburst through the clouds), (radiant sunshine), (illuminating the earth), (renewed strength), (resurgence), (transformation), (emerging from darkness), (rejuvenation), (vibrant colors), (uplifted mood), (recharged batteries), (bright horizon), (new beginnings).

Figure 4A:
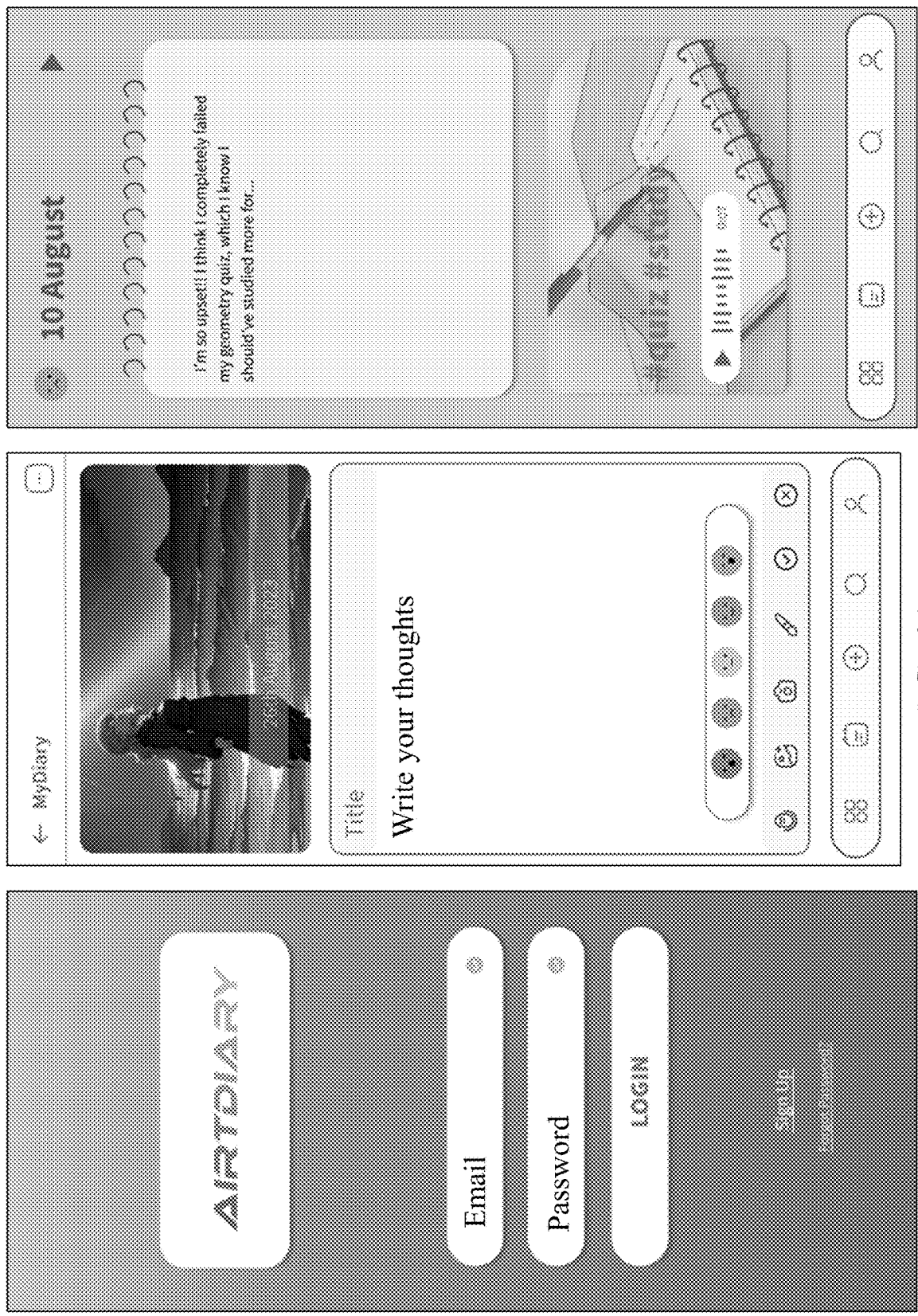
FIGS. 4A, 4B, 4C respectively depict exemplary screenshots of the user interface in accordance with various embodiments of the present invention.
Figure 4B:
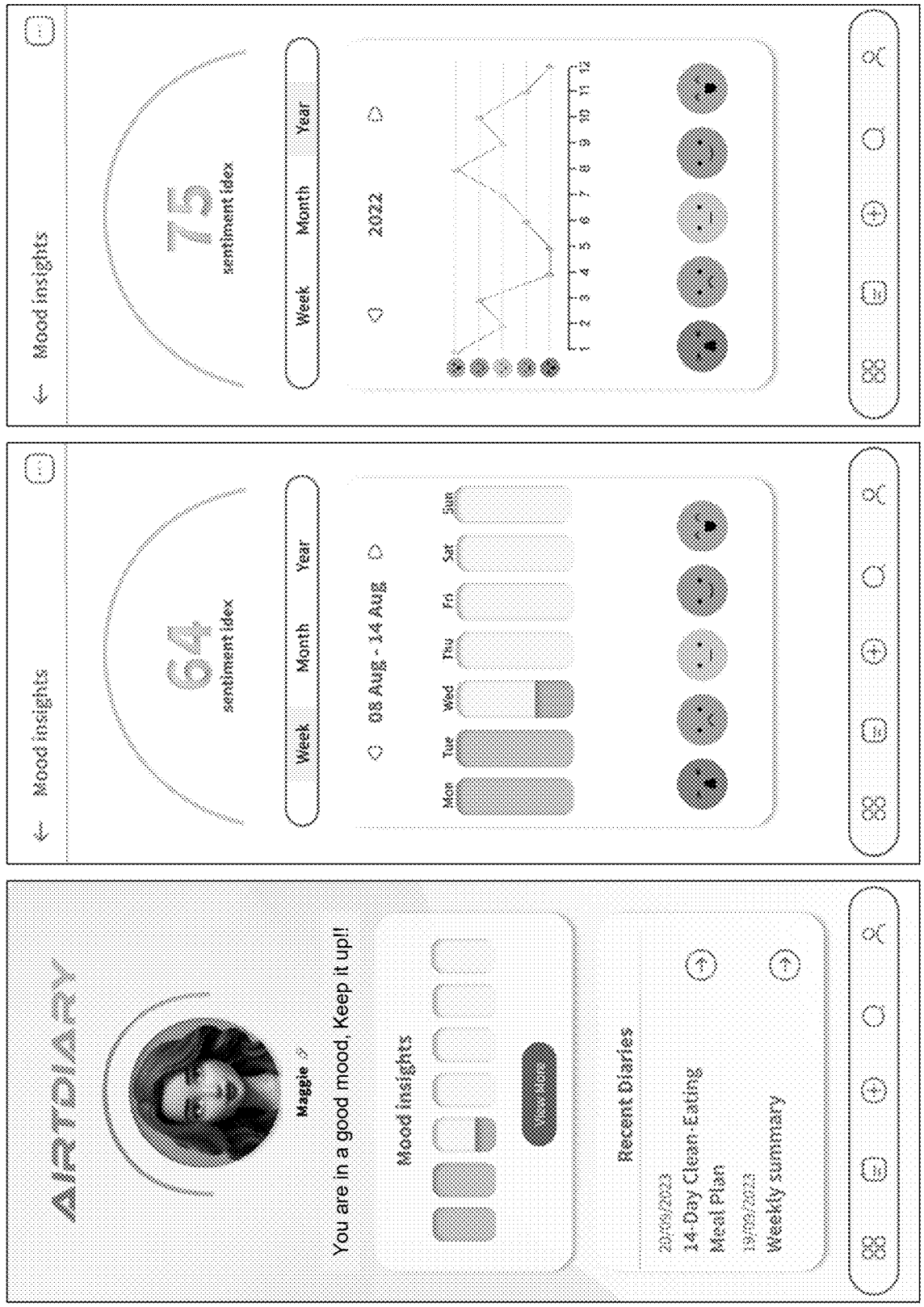
Figure 4C:
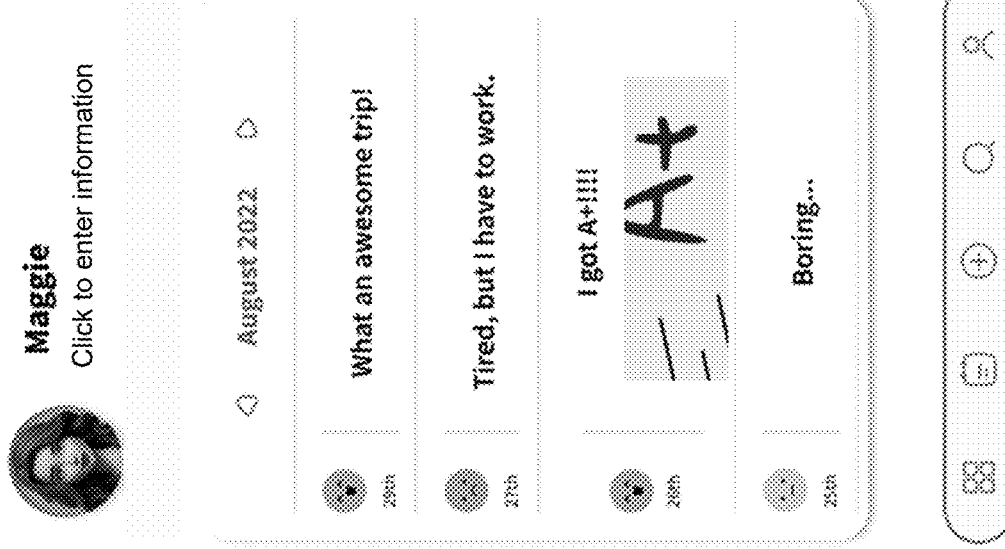

The user can see and read the revised content and the images via the user interface 102, as shown in FIGS. 4A, 4B, and 4C. The illustration of FIG. 4A demonstrates general use for the user operation via the user interface 102, so the user can see and read personal information, date, a typing zone, hash tags, and others. The apparatus 100 can record daily sentiment changes and generate dashboards. The illustration of FIG. 4B demonstrates dashboards showing the statistics over a period of time, such as daily, weekly, quarterly or yearly mood indicators, using custom symbols as labels. The illustration of FIG. 4C demonstrates a diary mode with texts and images with the corresponding timestamps. In various embodiments, the apparatus 100 is implemented on tablets, smartphones, notebooks, or portable consumer electronics, and displayed to users through their screens for easy operation and reading.

Figure 5:
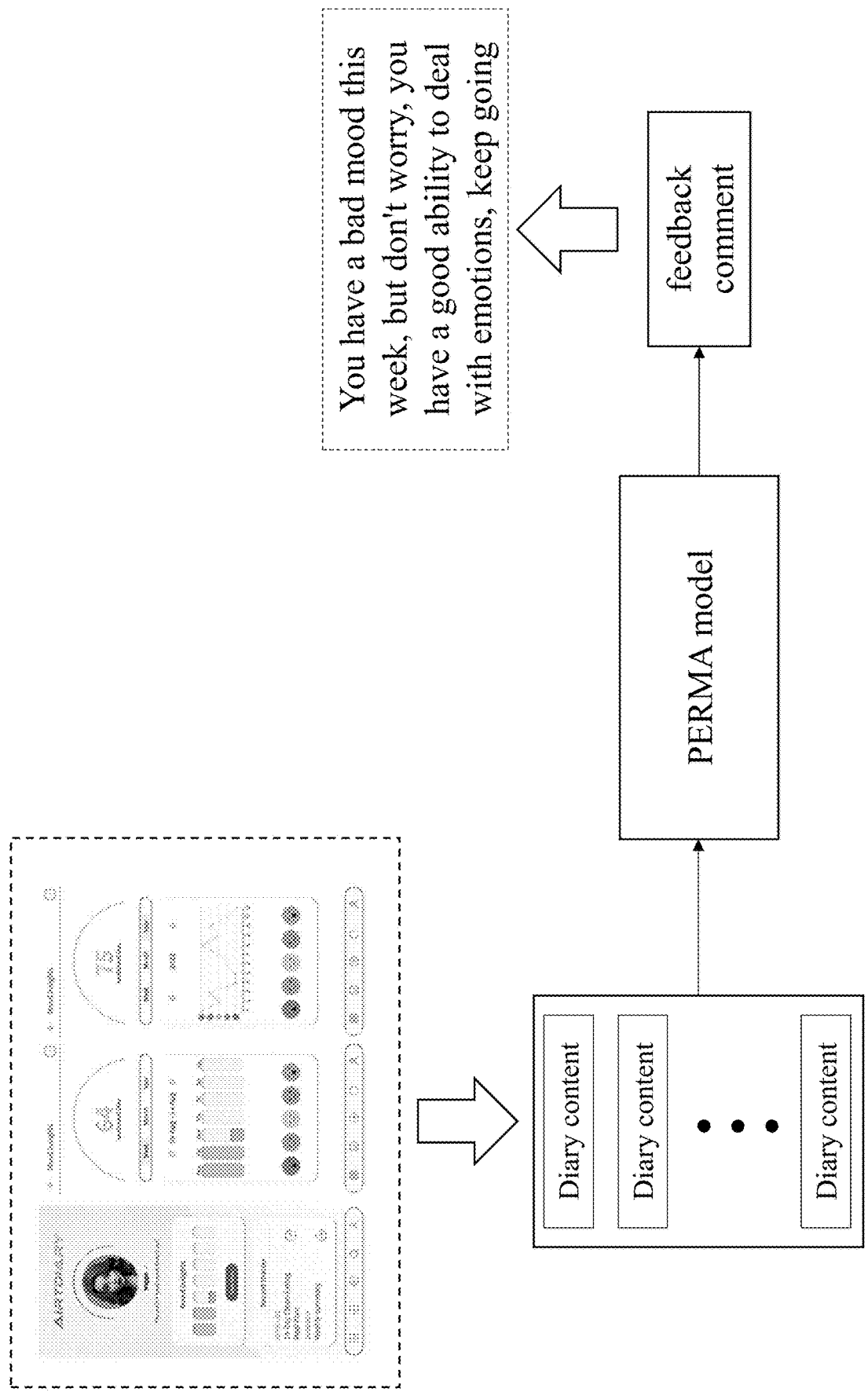
FIG. 5 depicts a schematic flowchart of a further analysis of emotions of a diary writer and in accordance with an embodiment of the present invention.

Referring to FIG. 5 for the following description. In addition to processing a certain number of diary entries per single day, the apparatus 100 can further provide feedback responses to the diary entries according to a certain time window by using the recorder in combination with the negative-text analysis module and the positive-text adding module. For example, after recording the entries of the diary for seven days in a week using the recorder, according to the bases of these seven days, the apparatus 100 can compile statistics by sorting out possibilities for negative emotions for the target week, so as to obtain the week comprehensive result. According to the result, by employing the LLM (e.g., the LLM 130 of FIG. 1), the apparatus 100 can provide a feedback response comment for informing the user. The feedback response comment is an encouraging statement in the second person. In the present embodiment, the feedback response comment includes: "you have a bad mood this week, but don't worry, you have a good ability to deal with emotions, keep going."

Although the present invention is presented with embodiments handling diaries, it is not limited to them. The scope of applicable objects may extend beyond diaries. Any form of written text falls within the present invention's utilization range. Briefly, feedback responses can be provided to a written text, converting the entirety of the written text, including the feedback response, into suitable prompts. These prompts are then employed to create images. For instance, in the case of users expressing emotions through lengthy compositions, the apparatus can also provide feedback responses for individual target paragraphs. Corresponding to these paragraphs and their feedback response, the apparatus creates the appropriate images, effectively transforming the written composition into a text accompanied with illustrative visuals.

The functional units and modules of the apparatuses, systems, and/or methods in accordance with the embodiments disclosed herein may be implemented using computer processors or electronic circuitries including but not limited to application specific integrated circuits (ASIC), field programmable gate arrays (FPGA), microcontrollers, and other programmable logic teaching aids configured or programmed according to the teachings of the present disclosure. Computer instructions or software codes running in the computing teaching aids, computer processors, or programmable logic teaching aids can readily be prepared by practitioners skilled in the software or electronic art based on the teachings of the present disclosure.

The embodiments may include computer storage media, transient and non-transient memory teaching aids having computer instructions or software codes stored therein, which can be used to program or configure the computing teaching aids, computer processors, or electronic circuitries to perform any of the processes of the present invention. The storage media, transient and non-transient memory teaching aids can include, but are not limited to, floppy disks, optical discs, Blu-ray Disc, DVD, CD-ROMs, and magneto-optical disks, ROMs, RAMs, flash memory teaching aids, or any type of media or teaching aids suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing teaching aids interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for analyzing emotions implied from diary entries and generating feedback responses to the diary entries, comprising:
   a recorder configured to receive and store a text article;
   a negative-text analysis module configured to analyze the text article and determine a negativity level and generate a basis for judgment according to an analyzing result with respect to the text article;
   a positive-text adding module configured to receive the basis from the negative-text analysis module, generate a feedback response that is positively oriented relative to the text article, and combine the text article with the feedback response to form a content;
   a visualization module configured to visualize the content for creating a visual image.

2. The apparatus of claim 1, wherein the generation of the feedback response comprises providing at least one sentence presented in first-person manner for positive guidance, and placing the feedback response immediately after the text article.

3. The apparatus of claim 1, wherein the negative-text analysis module generates the basis for judgment that contains a percentage value representing the negativity level of the text article.

4. The apparatus of claim 1, wherein the visualization module is configured to generate at least one visualization label in response to the content.

5. The apparatus of claim 4, wherein the visualization module generates the visual image according to the visualization label.

6. The apparatus of claim 5, wherein the visualization module comprises a latent text-to-image diffusion model which is capable of outputting the visual image that shows a single character against a landscape background or that shows a landscape only in response to the at least one visualization label.

7. The apparatus of claim 1, wherein the content formed by the positive-text adding module comprises the as-is text article.

8. The apparatus of claim 1, wherein the recorder is further configured to record outcomes of the negative-text analysis module, the positive-text adding module, and the visualization module, and the apparatus further comprises a user interface in electrical communication with the recorder and configured to show statistics over a period of time, comprising daily, weekly, quarterly or yearly mood indicators based on the outcomes.

9. The apparatus of claim 8, wherein the recorder in combination with the negative-text analysis module and the positive-text adding module is further configured to provide a feedback response comment to the diary entries according to a certain time window.

10. The apparatus of claim 9, wherein the feedback response comment comprises an encouraging statement in second person manner.

11. A method for analyzing emotions of diaries and generating feedback response on diaries, comprising, comprising:
   receiving and store a text article by a recorder;
   analyzing the text article and determining a negativity level of the text article by a negative-text analysis module;
   generating a basis for judgment according to the analyzing the text article by a negative-text analysis module;
   receiving the basis by a positive-text adding module;
   generating feedback response that is positively oriented relative to the text article in response to the basis by the positive-text adding module;
   combining the text article with the feedback response to form a content by the positive-text adding module; and
   visualizing the content for creating a visual image in response to the content by a visualization module.

12. The apparatus of claim 11, wherein the generation of the feedback response comprises providing at least one sentence presented in first-person manner for positive guidance, and placing the feedback response immediately after the text article.

13. The method of claim 11, wherein the basis for judgment is generated to contain a percentage value representing the negativity level of the text article.

14. The method of claim 11, further comprising generating at least one visualization label in response to the content by the visualization module.

15. The method of claim 14, wherein the generating the visual image is performed by the visualization module according to the visualization label.

16. The apparatus of claim 15, wherein the visualizing the content for creating the visual image is performed such that the visual image that shows a single character against a landscape background or that shows a landscape only in response to the at least one visualization label is outputted by a latent text-to-image diffusion model of the visualization module.

17. The apparatus of claim 11, wherein the content formed by the positive-text adding module comprises the as-is text article.

18. The apparatus of claim 11, further comprising:
   recording, by the recorder, outcomes of the negative-text analysis module, the positive-text adding module, and the visualization module; and
   showing, by a user interface, statistics over a period of time, comprising daily, weekly, quarterly or yearly mood indicators based on the outcomes.

19. The apparatus of claim 18, further comprising:
   providing, by the recorder in combination with the negative-text analysis module and the positive-text adding module, a feedback response comment to the diary entries according to a certain time window.

20. The apparatus of claim 19, wherein the feedback response comment comprises an encouraging statement in second person manner.

\* \* \* \* \*